Feb. 6, 1968   B. E. ANTHONY ET AL   3,367,064
TURKEY CALLER
Filed April 23, 1965
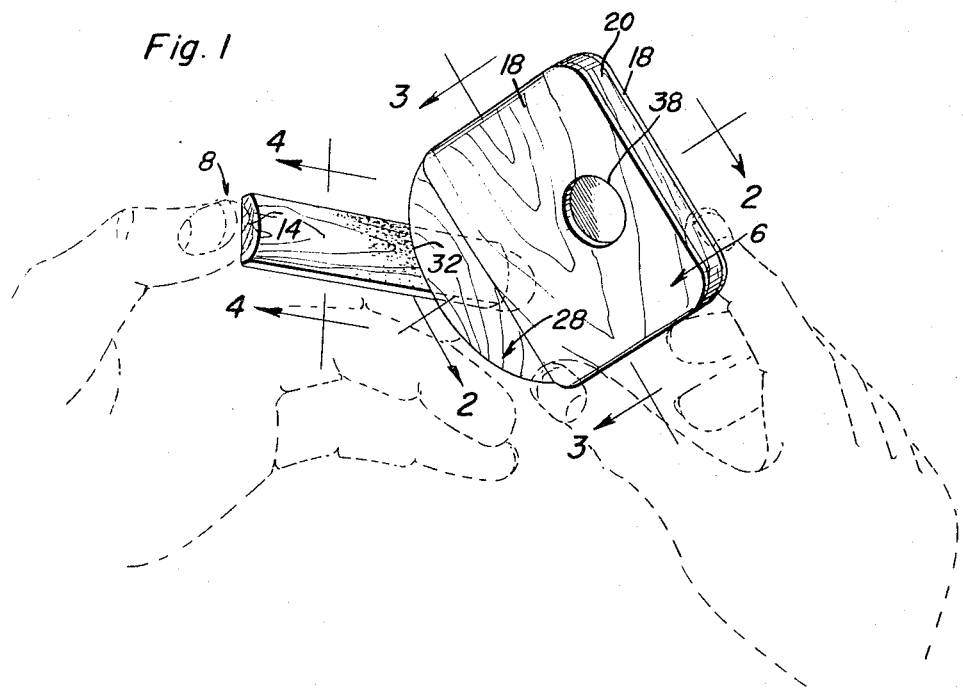
Fig. 1
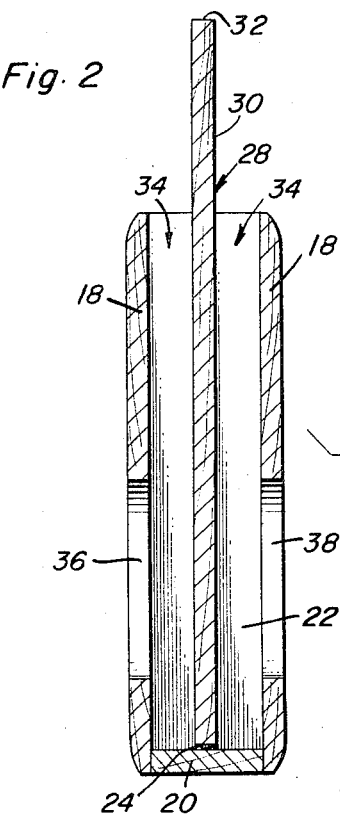
Fig. 2
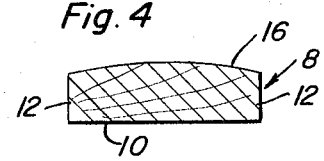
Fig. 4
Fig. 3
Buzze E. Anthony
Jay E. Anthony
INVENTORS
BY *Clarence A. O'Brien*
and *Harvey B. Jackson*
Attorneys

United States Patent Office 3,367,064
Patented Feb. 6, 1968

3,367,064
TURKEY CALLER
Buzze E. Anthony and Jay E. Anthony, Punxsutawney,
Pa. (both of Austin, Pa. 16720)
Filed Apr. 23, 1965, Ser. No. 450,336
2 Claims. (Cl. 46—189)

ABSTRACT OF THE DISCLOSURE

The herein disclosed turkey caller is characterized by a hollow wooden box such that it may be held by the fingers of one hand. This box is open at one end and embodies parallel panel-like walls joined marginally by an intervening rim embodying bottom and end walls. The panel-like walls are provided with suitably enlarged sound discharging holes. A thin wooden partition, called a diaphragm, is fitted into the hollow chamber portion of the box and has a projecting marginal edge. A block-like diaphragm striker or vibrator is adapted to be held in the other hand and has a convex surface which can be raked across said marginal edge in a manner to vibrate the diaphragm.

---

The present invention relates to manually actuatable and controllable callers and pertains, more particularly, to a novelly constructed turkey caller characterized by two simple easy-to-use component parts which, when properly oriented and handled enables a practiced user, usually an experienced hunter acquainted with hunting wild turkeys, to lure potential victims within reliable shooting range.

It is old in the art to provide a call which is characterized by a vibratory sound-producing diaphragm or plate, to entrap and amplify the sound waves in a wooden or an equivalent acoustical chamber, a box for example, to cause the diaphragm to respond and generate vibratory sounds with the aid of a hand held component or part, for example, a piece of slate, a striker block, bow or the like. The bird call of Draughon, Patent No. 651,752 is exemplary of the state of the art and may, if desired, be referred to for verification.

An object of the present invention is to structurally, functionally and in other ways improve upon prior art calls, more particularly, turkey callers and, in so doing, to provide a significantly efficient caller which, it is submitted, better serves the purposes for which it has been perfected and satisfactorily used.

In carrying out the present invention the wooden or equivalent vibratory diaphragm is marginally fastened within the confines of the sound amplifying chamber of a simple easily and effectually usable sound box. This box may, if desired, be rectangular and has opposed panel-like side walls with sound holes therein.

The invention features the aforementioned adaptation wherein the diaphragm divides the sound chamber into duplicate uniform half-portions and, in addition, one edge portion of the diaphragm projects beyond an open mouth portion of the box where it is rendered accessible for use in association with a diaphragm striking and rubbing member herein referred to as a block-type bow.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective of a turkey caller constructed in accordance with the principles of the present invention and showing the manner in which the component parts are individually held in the user's hands and are oriented and brought into cooperative usable relationship.

FIGURE 2 is an enlarged central cross-sectional view taken on the plane of the section line 2—2 of FIGURE 1 looking in the direction of the indicating arrows.

FIGURE 3 is a view at right angles to FIGURE 2 also enlarged and taken on the plane of the section line 3—3 of FIGURE 1.

FIGURE 4 is an enlarged cross-section taken on the plane of the section line 4—4 of FIGURE 1.

Referring now to the views of the drawing it will be seen that the turkey caller, generally speaking, is characterized by two component units or parts; namely, a generally rectangular relatively thin sound box 6 and a wooden or equivalent elongated block-like sound generating or producing member which has been customarily referred to in the trade as a hand held and operated bow 8. The latter because of simplicity will be described first and comprises an elongated stick or block of a suitable grade of wood having a flat bottom side 10 (FIGURE 4), longitudinal parallel flat stides 12 straight cut transverse ends 14 and a convex friction producing and rubbing surface 16 which in practice is coated with chalk such as is provided with the caller when sold to a purchaser. The bow 8 is of a length that it may be conveniently held as suggested in phantom lines in FIGURE 1 between the thumb and index finger of one hand, for example, the left hand.

The audible call producing and amplifying unit 6 comprises the aforementioned thin rectangular hollow box which, in turn, is made from lightweight vibratory wood and comprises a pair of opposed spaced walls or panels 18 which are duplicates of each other. The marginal edges of these two panels are joined by an encompassing rim which comprises a wooden or equivalent insert 20 at the bottom joined at its ends or corners with similar inserts or end members 22 as shown for example in FIGURE 3. The interior of the bottom member is flat as at 24 (FIGURE 2). The interior vertical walls of the rim members 22 are provided with opposed registering grooves 26 into which cooperating marginal edge portions of the vibratory wooden or equivalent diaphragm 28 fit in the manner illustrated in FIGURES 2 and 3. The diaphragm is substantially rectangular, that is the body portion so that it can be fitted with requisite nicety into the median portion of the sound trapping and amplifying chamber of the sound box 6. The diaphragm has an extruding upper portion, that is a portion 30 which projects beyond the open mouth of the box and has a curvilineal edge 32. By fitting the edges into grooves the chamber is divided or partitioned into a pair of duplicate sound amplifying chambers 34 each of which functions in the same manner. To the ends desired, the chambers open through the mouth of the box but also ave communication with the atmosphere by way of the relatively large circular sound holes 36 and 38 as illustrated in FIGURE 2.

It will be understood that the simple dual unit turkey caller or "talker" herein disclosed is comparable with other calls in the category required in that it simply takes practice and patience to attain the desired yelps and yodels. With practice the user can master a call which is so natural that it can prove out to fool a hunter in the woods along with the turkey. Because of this factor alone, it is recommended that the user should not conceal himself in sight of another hunter, this for the safety of all concerned. It is perhaps advisable to sit or stand by a large tree while calling, the tree being ample camouflage for the purposes.

In using this turkey caller or talker it is recommended that the convex side of the bow or block be well chalked at all times. Hold the bow 8 as shown in the illustration in FIGURE 1 preferably between the index finger and thumb of the left hand. Lean the top of the call or box slightly away from you and apply slight pressure and take short diagonal strokes pulling the call or box toward you when holding the same with the thumb and index finger also as suggested in phantom lines in FIGURE 1. With some practice all unnatural sounds can be overcome and a natural call of the turkey can be simulated. When calling the turkeys it is recommended that the user should give three to four calls and then pause. If answered, it is significant to respond in a manner similar to the response received from the potentially usable turkey, it being remembered that the turkey is likely looking for other members of his flock and will respond. It is also desirable, as experience has shown, that if no answer is heard it would be advisable to repeat the call every 10 or 15 minutes also keeping in mind that best results are obtained when the flock has been broken up either by the user of the caller or by some other near-by hunter. In fact, it is good practice to call occasionally inasmuch as some other hunter may have broken up a flock in the near-by area not known about. As suggested before when using an invention in the field of endeavor under consideration it is necessary to practice since weather conditions, area obstructions and the like can make the diffenrence between failure and success.

It is submitted that a careful consideration of the specification in conjunction with the views of the drawing will enable the reader to obtain a clear and comprehensive understanding of the invention, the features and advantages and mode of use. Accordingly, a more extended description is regarded as unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A turkey caller embodying means comprising a sound box adapted to be held by the fingers of one hand, said sound box comprising a pair of opposed spaced parallel duplicate panels constituting cooperable front and back walls, a complemental encompassing rim interposed between and interconnecting marginal edge portions of said front and back walls and made up of three companion walls, namely, a bottom wall and a pair of opposed end walls with coacting end portions joined together, the hollow portion of said box constituting a sound trapping and amplifying chamber, said box being open and providing a sound discharge mouth at one end only, a median lower portion of each front and back wall being provided with a relatively large sound discharging hole, a relatively thin vibratory sound generating diaphragm, said diaphragm being made of wood and having a major body portion thereof fitted into said chamber and having a bottom marginal edge resting atop and interior surface of said bottom wall, having marginal walls seated and keyed in grooves provided therefor in said end walls, and having one end portion projecting outwardly beyond the aforementioned mouth of said box and terminating in a curvilineal edge, said diaphragm being spaced from interior surfaces of said front and back walls and transforming said chamber into a pair of individual sound trapping and amplifying compartments.

2. The structure defined in an according to claim 1 and, wherein said means comprises, in combination, an elongated diaphragm raking and vibrating block adapted to be held and manipulated by the fingers of the other hand and having an elongated convex surface which can be coated with chalk and pushed, pulled and drawn in a bow-like manner diagonally across said curvilineal edge to vibrate the diaphragm to produce varying turkey calls at will.

References Cited
UNITED STATES PATENTS

| | | | |
|---|---|---|---|
| 2,515,023 | 7/1950 | Thompson et al. | 46—189 |
| 2,958,157 | 11/1960 | Tannehill | 46—189 |
| 3,129,527 | 4/1964 | Williams | 46—177 |

LOUIS G. MANCENE, *Primary Examiner.*

ANTON O. OECHSLE, *Examiner.*

R. F. CUTTING, *Assistant Examiner.*